United States Patent
Boston et al.

(10) Patent No.: US 8,382,442 B2
(45) Date of Patent: Feb. 26, 2013

(54) CONTROLLABLE PITCH BLADE NON-DUCTED PROPELLER FOR JET ENGINE

(75) Inventors: Eric Jacques Boston, Cesson (FR); Michel Andre Bouru, Montereau sur le Jard (FR); Adrien Jacques Philippe Fabre, Montrouge (FR); Laurent Jablonski, Melun (FR); Philippe Gerard Edmond Joly, Vaux le Penil (FR)

(73) Assignee: SNECMA, Paris (FR)

(*) Notice: Subject to any disclaimer, the term of this patent is extended or adjusted under 35 U.S.C. 154(b) by 498 days.

(21) Appl. No.: 12/727,590

(22) Filed: Mar. 19, 2010

(65) Prior Publication Data

US 2010/0239421 A1 Sep. 23, 2010

(30) Foreign Application Priority Data

Mar. 23, 2009 (FR) .................................... 09 01343
Aug. 31, 2009 (FR) .................................... 09 04126

(51) Int. Cl.
*F03D 11/00* (2006.01)
(52) U.S. Cl. .................. 416/248; 416/174; 416/207
(58) Field of Classification Search .................. 416/174, 416/207, 248
See application file for complete search history.

(56) References Cited

U.S. PATENT DOCUMENTS

| 12,665 | A | * | 4/1855 | Perkins | .......................... 122/114 |
|---|---|---|---|---|---|
| 1,783,225 | A | * | 12/1930 | Dicks | ............................ 416/207 |
| 3,597,111 | A | * | 8/1971 | Salisbury et al. | ............. 416/206 |
| 4,579,510 | A | * | 4/1986 | Christensen-Dalsgaard | . 416/135 |
| 4,782,852 | A | | 11/1988 | Legris | |
| 5,333,915 | A | | 8/1994 | Sparling et al. | |
| 5,464,324 | A | * | 11/1995 | Langenberg | .................. 416/167 |
| 5,772,373 | A | * | 6/1998 | Cronin et al. | ................. 411/120 |
| 6,071,076 | A | * | 6/2000 | Ansari et al. | ............. 416/168 R |
| 6,142,735 | A | * | 11/2000 | Muller | ........................ 416/164 |

FOREIGN PATENT DOCUMENTS

| CH | 194 633 | 12/1937 |
|---|---|---|
| EP | 0 267 097 | 5/1988 |
| FR | 2 641 251 | 7/1990 |
| GB | 149 755 | 8/1920 |
| GB | 2 051 661 A | 1/1981 |
| WO | WO 97/18925 | 5/1997 |

OTHER PUBLICATIONS

U.S. Appl. No. 13/258,481, filed Oct. 28, 2011, Bouru, et al.
U.S. Appl. No. 13/382,026, filed Jan. 3, 2012, Boston, et al.
U.S. Appl. No. 13/389,031, filed Feb. 6, 2012, Boston, et al.

* cited by examiner

*Primary Examiner* — Ninh H Nguyen
*Assistant Examiner* — Joshua R Beebe
(74) *Attorney, Agent, or Firm* — Oblon, Spivak, McClelland, Maier & Neustadt, L.L.P.

(57) ABSTRACT

Controllable pitch blade non-ducted propeller for a jet engine, comprising a rotor member comprising radial housing for mounting blade support plates, each plate being attached in a ring centered and guided in rotation in a housing of the rotor member and comprising external toothing engaged and locked in internal toothing of the ring, to withstand the centrifugal forces to which the propeller blades are subjected in operation.

21 Claims, 8 Drawing Sheets

CONTROLLABLE PITCH BLADE NON-DUCTED PROPELLER FOR JET ENGINE

The present invention relates to a controlled pitch blade propeller for a jet engine of the non-ducted propeller type (referred to as "open rotor" or "unducted fan").

A jet engine of this type comprises two coaxial and counter-rotating external propellers, upstream and downstream respectively, each rotated by one turbine of the jet engine and extending substantially radially outside the nacelle of said jet engine.

Each propeller comprises a polygonal rotor member comprising substantially radial housing distributed about the longitudinal axis of the jet engine and wherein propeller blade support plates are mounted. Each blade comprises for example a dovetail section base inserted in a complementarily shaped groove of the plate.

Each plate comprises a substantially cylindrical body screwed into a cylindrical ring centered and guided in rotation in a housing of the rotor member by means of roller or ball stops.

The plates and the rings can rotate in the housings of the rotor member and are rotated about the blade axes by suitable means so as to set the angular pitch of the blades, and optimize same according to the jet engine operating conditions.

In operation, the propeller blades are subject to very high centrifugal forces of up to 30,000 daN, these forces being transmitted to the rotor member via the plates, rings and roller stops and passing through the plate screw threads in the rings. These threads are, however, not designed to transmit such loads and are at a risk of being damaged rapidly, thus limiting the service life of the propeller.

The aim of the invention is particularly that of providing a simple, effective and economical solution for this problem.

It relates to a propeller of the type mentioned above wherein the transmission of the loads between each blade support plate and the ring thereof is performed by relatively large bearing surfaces and not by threads which are relatively fragile.

For this purpose, it proposes a controllable pitch blade non-ducted propeller for a jet engine, the propeller blades being rotatably mounted about the axes thereof in radial housings of an annular rotor member and each blade being supported by a cylindrical body plate whereon a cylindrical ring is attached, centered and guided in rotation by bearings in a radial housing of the rotor member, wherein, the ring being engaged in the housing by radial translation from the inside and the plate being engaged in said housing by radial translation from the outside, the internal surface of the ring and the external surface of the cylindrical body of the plate comprise complementary protruding teeth enabling radial translation of the teeth of the body of the plate between the teeth of the ring and the radial retention of the teeth of the body of the plate by the teeth of the ring, after rotating the plate in relation to the ring by a predetermined angle.

According to the invention, each blade support plate comprises at the cylindrical body thereof toothing engaged and locked in radial support on complementary toothing of the ring, to withstand the centrifugal loads applied to the blade in operation. The toothing of the plate thus engages with the complementary toothing of the ring to provide direct mechanical retention of the plate and the transmission of the centrifugal loads by the ring to the rotor member. This makes it possible to increase the service life of the propeller significantly.

The plate is mounted by means of claw coupling in the ring thereof and not by means of screwing as in the prior art. The teeth of the plate and the ring are designed to withstand the loads to which the blades are subjected in operation. In a simple manner, the plate is mounted in the ring as follows. The plate is aligned axially with the ring and the teeth thereof are aligned axially with the circumferential gaps situated between the teeth of the ring. The plate is moved by means of radial translation towards the ring in the housing of the rotor member from said first position to a second position wherein the teeth of the plate have been moved beyond the teeth of the ring, radially inside said teeth. Before reaching said second position, the teeth of the plate pass through an intermediate position wherein they are aligned in the circumferential direction with the teeth of the ring, in relation to the axis of the housing. The plate is then rotated by a predetermined angle about the axis thereof such that the teeth thereof are aligned in a direction parallel with the axis of the housing, with the teeth of the ring. The plate is then retained in the outward radial direction by pressing the teeth thereof on the teeth of the plate.

The cylindrical body of the plate may comprise three teeth each with an angular span of approximately 60° and which are regularly distributed about the axis of said body. In an alternative embodiment, the cylindrical portion of the plate may comprise two teeth each having an angular span of approximately 90° and which are diametrically opposed in relation to the axis of the cylindrical body. However, the number of teeth of the plate may be greater than 3.

In a further alternative embodiment, the internal surface of the ring and the external surface of the body of the plate may each comprise at least two annular rows of teeth, the first and second row of teeth of the ring being, in a normal position for mounting and use, situated respectively radially outside the first and the second row of teeth of the body of the plate.

In this case, the body of the plate and the ring are thus each equipped with two superimposed sets of toothing, instead of a single set of toothing in the aforementioned art. The doubling of the toothing of the plates and rings reduces the dimensions thereof and thus the size thereof, particularly in the radial direction in relation to the axes of the plates and rings, or increases the safety of the system connecting the plates to the rings and ensures that the blades are retained in operation.

The teeth of one of the rows of teeth of the body of the plate (first row of teeth of the body of the plate) may press, in the normal position for use, radially outwards on the teeth of the corresponding row of the ring (first row of teeth of the ring), whereas the teeth of the second row of the body of the plate are separated by a short radial distance from the teeth of the second row of the ring.

The centrifugal loads applied to the blades in operation are then transmitted from the plate to the ring by the teeth of the first row of the plate supported on the teeth of the first row of the ring. In the event of rupture or deformation of the teeth of said first rows, the plate is moved in radial translation outward over a short distance, until the teeth of the second row of the plate are supported on the teeth of the second row of the ring. The teeth of said second rows thus provide the transmission of the centrifugal loads applied on the blades in operation. The second sets of toothing of the plate and the ring thus ensure, in this case, the radial retention of the blade and the transmission of the abovementioned loads, in the event of rupture or deformation of the first sets of toothing thereof.

In the latter case, roller stop vibration sensors mounted between the body of the plate and the ring, detect the unbalance generated by the radial outward movement of the blade. This information is then sent to the pilot of the aircraft equipped with the jet engine, who can then shut down the engine and notify the maintenance department.

The radial distance over which the plate is moved in the event of deformation or rupture of the teeth of the first row thereof or of those of the ring, is equivalent to the radial distance separating the teeth of the second rows of the plate and the ring, respectively, and is at most equal to some tens of millimeters. This distance is, for example, between 0.1 and 0.2 mm.

Advantageously, the first row of teeth of the body of the plate is situated radially inside the second row of teeth of said body. In this way, in the normal position for use, the body of the plate is radially supported on the ring by means of the radially internal toothing thereof. In the event of wear, deformation or rupture of said toothing or of the radially internal toothing of the ring, the body of the plate is supported by the radially external toothing thereof on the ring.

In one alternative embodiment of the invention, the teeth of the first and second rows of the body of the plate press radially outward on the teeth of the first and second rows of the ring, respectively.

Therefore, in this case, there is no clearance, in the normal position for use, between the teeth of the two rows of the plate and those of the ring. All these teeth thus enable the transmission of the abovementioned loads distributed on both rows.

This solution enables the reduction of the dimensions of the teeth and, in particular, the radial dimensions thereof in relation to the axis of the plate and the ring.

The teeth of the or each row of the body of the plate are supported on the corresponding teeth of the ring by a cylindrical tooth bearing having a relatively small dimension in the radial direction, in relation to the axis of the body of the plate. For example, this dimension is greater than or equal to 1.5 mm.

The reduction in the radial size of the teeth of the body of the plate and the ring enables an increase in the internal diameter of the body of the plate, inside which the means for connecting the plate and the ring to blade rotation drive means are mounted. These connection means may comprise a planet pinion or gear for reducing the blade maneuvering loads. The mounting of these connection means inside the body of the plate according to the invention is easier than in the prior art, due to the extension of the internal diameter of said body.

Preferentially, the teeth of each row of the ring are distributed regularly about the axis of the ring and are each aligned in the radial direction with a tooth of the other row of the ring, and the teeth of each row of the body of the plate are distributed regularly about the axis of said body and are each aligned in the radial direction with a tooth of the other row of the body of the plate.

Advantageously, the propeller according to the invention further comprises means for locking the body of the plate in rotation in the ring, said locking means comprising for example wedges in the form of cylinder sectors inserted between the teeth of the cylindrical body of the plate and the ring. Each wedge is inserted, for example by translation in a direction parallel with the axis of the housing, between two consecutive teeth of the plate and between two consecutive teeth of the ring. These wedges engage by abutment in the circumferential direction with the circumferential ends of the teeth of the plate and the ring to lock the plate in rotation with respect to the ring.

A nut may be screwed onto the ring from the inside of the housing to rest on one of the ends of the wedges so as to hold said wedges in position, the radially external ends of the wedges optionally resting on an edge or annular shoulder of the plate.

This nut is used solely for the purposes of pressing and holding the wedges as described above, and is thus not subject to stress for the transmission of the loads transmitted by the blade in operation.

An annular locking washer is advantageously inserted between the wedges and the nut screwed onto the ring, said washer comprising first means engaging via shape connections with complementary means of at least one of the wedges, and second means engaging via shape connections with complementary means of the nut, to lock the nut in rotation with respect to the ring.

The ring is centered and guided in rotation in the housing of the polygonal ring by two coaxial bearings, one of which may be mounted between an external annular edge of the ring and an internal annular edge of the radially external end of the housing, the other bearing being mounted between an external annular edge of the ring at the radially internal end thereof, and a nut screwed into the radially internal end portion of the housing of the rotor member.

If the internal surface of the ring comprises two coaxial annular rows of teeth, said rows may be substantially aligned in the transverse direction, in relation to the axis of the ring, with the external annular edges thereof, respectively.

An annular locking washer is advantageously inserted between said other bearing and the nut screwed into the housing, said washer comprising first means engaging via shape connections with complementary means of the housing, and second means engaging via shape connections with complementary means of the nut, to lock the nut in rotation in the housing.

Furthermore, each housing of the rotor member may be closed at the radially internal end thereof using an annular cover screwed onto the rotor member and pressing against the radially internal end of the ring housed in said housing.

The present invention also relates to a jet engine, wherein it comprises at least one propeller as described above.

The invention will be understood more clearly and further details, features and advantages of the present invention will emerge more clearly on reading the following description given as a non-limitative example with reference to the appended figures, wherein.

Figure 1:
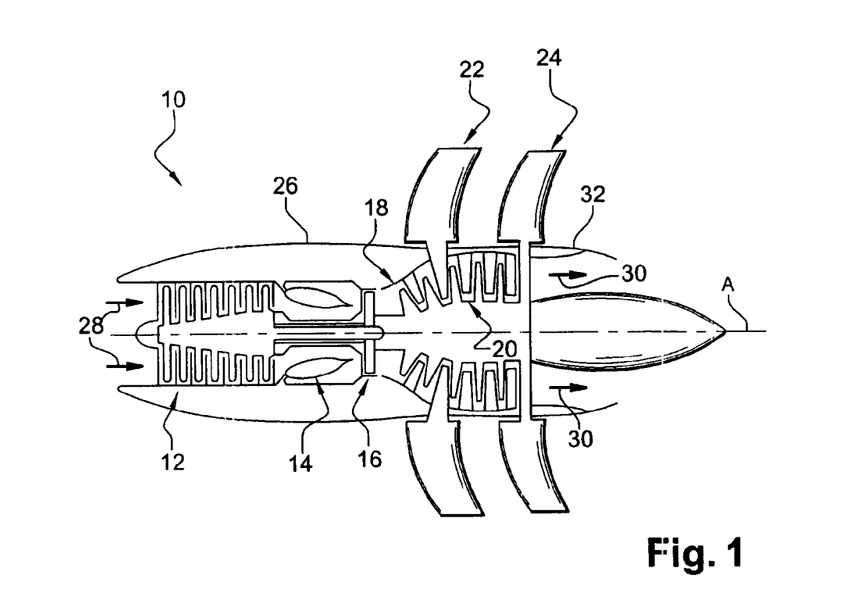
FIG. 1 is a schematic axial section view of a jet engine with non-ducted propellers.

Reference is first made to FIG. 1 which represents a jet engine 10 with non-ducted propellers (referred to as "open rotor" or "unducted fan") comprising upstream to downstream, in the gas flow direction inside the jet engine, a compressor 12, an annular combustion chamber 14, a high-pressure turbine 16 and two low-pressure turbines 18,20 which are counter-rotating, i.e. rotating in two opposite directions about the longitudinal axis A of the jet engine.

Each of said downstream turbines 18, 20 is rigidly connected in rotation with an external propeller 22, 24 extending radially outward from the nacelle 26 of the jet engine, said nacelle 26 being substantially cylindrical and extending along the axis A about the compressor 12, the combustion chamber 14, and the turbines 16, 18 and 20.

The air flow 28 entering the jet engine is compressed and is mixed with fuel and burned in the combustion chamber 14, the combustion gases subsequently entering the turbines to rotate the propellers 22, 24 supplying the majority of the thrust generated by the jet engine. The combustion gases from the turbines are expelled via a nozzle 32 (arrows 30) to increase the thrust.

The propellers 22, 24 are arranged coaxially one behind the other and comprise a plurality of blades regularly distributed about the axis A of the jet engine. These blades extend substantially radially and are of the controllable pitch type, i.e. they can rotate about the axes thereof to optimize the angular position thereof according to the operating conditions of the jet engine.

Figure 2:
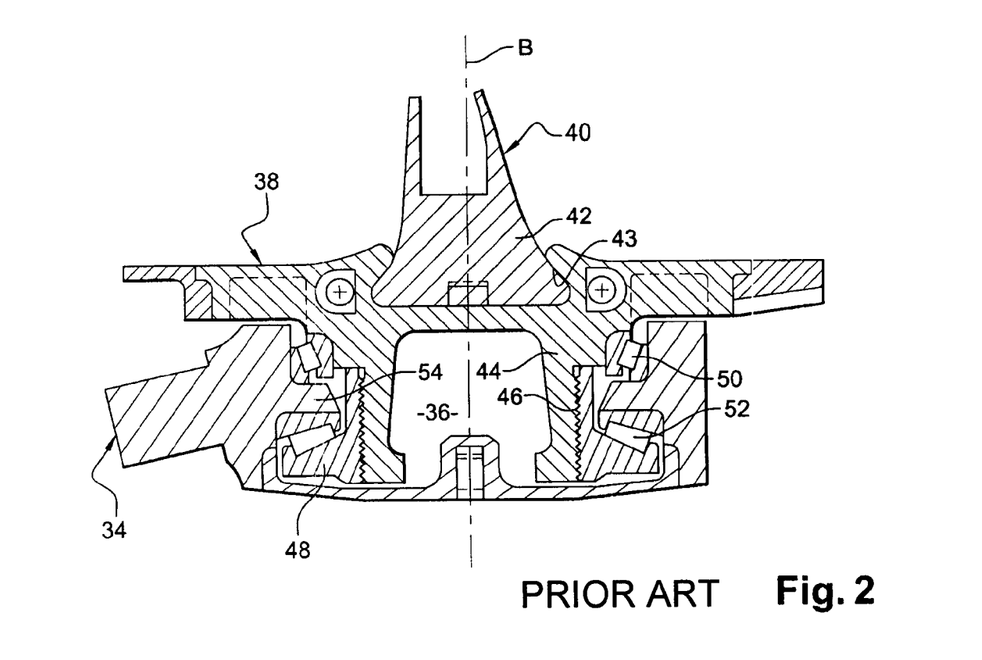
FIG. 2 is a schematic partial section view of a non-ducted propeller according to the prior art, and represents a blade support plate, said plate being screwed into a ring centered and guided in a housing of a rotor member of said propeller.

In a known assembly represented in FIG. 2 and described in the document U.S. Pat. No. 5,263,898, each propeller comprises a rotor member formed by a polygonal ring 34 extending about the axis A and comprising a plurality of substantially cylindrical radial housings 36 wherein means for mounting the propeller blades 40 are inserted.

Each blade 40 comprises at the radially internal end thereof a base 42 having a dovetail type section, inserted and retained in a groove 43 of a plate 38.

The plate 38 comprises a cylindrical body 44 with external threading 46 for the screwing thereof from the outside in a ring 48 inserted in the housing 36 of the polygonal ring 34 from the inside, in relation to the longitudinal axis A of the jet engine.

The ring 48 is centered and guided in rotation in the housing 36 by means of two roller bearings 50, 52. The housing 36 of the ring is divided into two portions, the radially internal and external portions respectively, by an internal annular edge 54 of the ring. A first roller bearing 50 is mounted radially outside said edge 54, between said edge and the plate 38. The second roller bearing 52 is mounted radially inside the edge 54, between said edge and the ring 48. The plate 38 and the ring 48 are rotated about the radial axis B of the housing 36 by suitable means not shown, to rotate the blade 40 about said axis and optimize the angular pitch thereof.

In operation, the blades 40 are subject to considerable centrifugal loads (up to 30,000 daN) transmitted from the blades 40 to the polygonal ring 34 via the threads 46 of the plates and the rings, which are generally not designed to withstand such loads. It would be possible to oversize said threads (so-called "artillery pitch" screw pitch) so that they withstand said loads, but, mechanically, reliance on threads (irrespective of the shape thereof) for the transmission of said loads is not optimal for ensuring the durability and reliability required of aeronautical parts.

The invention offers a solution to this problem through the assembly of the blade support plates in rings not by screwing but by means of claw coupling, the claw teeth of the plate and the ring engaging by means of radial support to ensure the transmission of the centrifugal loads in operation.

FIGS. 3 to 10 represent an embodiment of a non-ducted propeller according to the invention, the blades of said propeller not being shown for more clarity and being mounted on the support means thereof as in the prior art.

Figure 3:
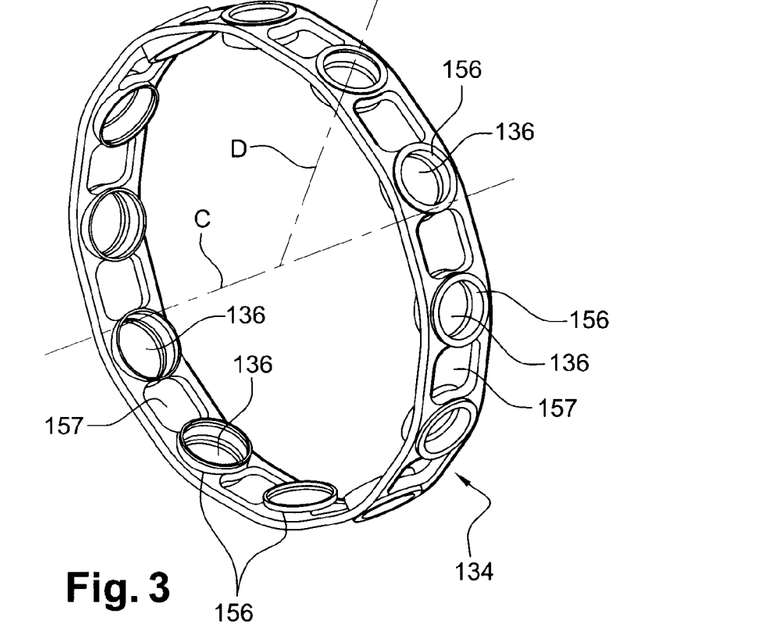
FIG. 3 is a schematic perspective view of a rotor member of a propeller according to the invention.

The polygonal ring 134 of the propeller according to the invention is seen in full in FIG. 3. It comprises substantially radial cylindrical housings 136, for example twelve in number, in each of which a plate and a ring are to be mounted, as explained in more detail hereinafter.

The polygonal ring 134 comprises a plurality of recesses 157 distributed regularly about the axis C of the ring and formed in the cylindrical wall of the ring to lighten same. Each recess 157 is situated between two consecutive radial housings 136.

Figure 4:
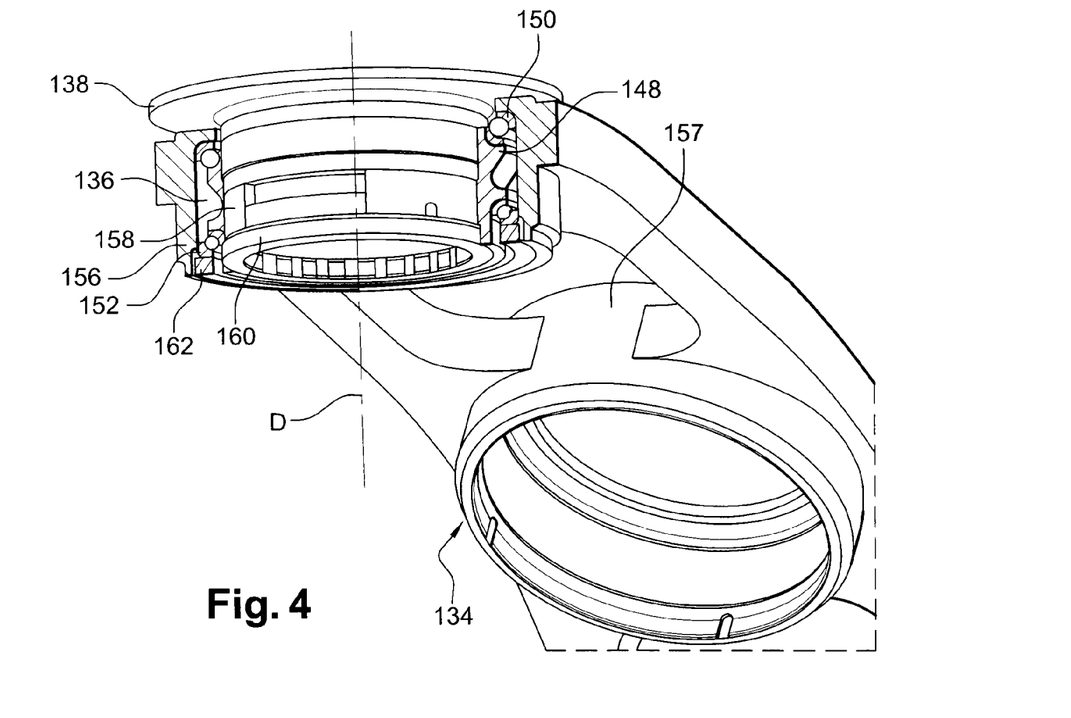
FIG. 4 is a partial schematic perspective view, with partial extraction, of the rotor member in FIG. 3, on a larger scale and in a housing wherein a blade support plate and a ring according to the invention are mounted, the plate being mounted by means of claw coupling in the ring.

FIG. 4 is a partial larger-scale view of said polygonal ring 134 an axial section of which was produced substantially in the middle of a cylindrical housing 136 of the ring.

Means for supporting a blade (not shown) and guiding said blade in rotation are mounted in each housing 136 of the polygonal ring 134, one of said means being shown in FIG. 4.

These means comprise a blade support plate 138 mounted by means of claw coupling inside a ring 148 centered and guided in rotation in the housing 136 of the polygonal ring 134 by means of two coaxial ball bearings 150, 152. The plate 138 and the ring 148 are locked in rotation in relation to each other by wedges 158. The plate 138 and the ring 148 are rigidly connected in rotation with each other and are centered and guided in rotation about a radial axis D which is the axis of the housing 136 of the ring. Nuts 160, 162 are screwed onto the ring 148 and on the cylindrical wall 156 of the ring 134, respectively, to lock the above-mentioned members together.

The various steps for mounting said members will now be described with reference to FIGS. 5 to 10.

Figure 5:
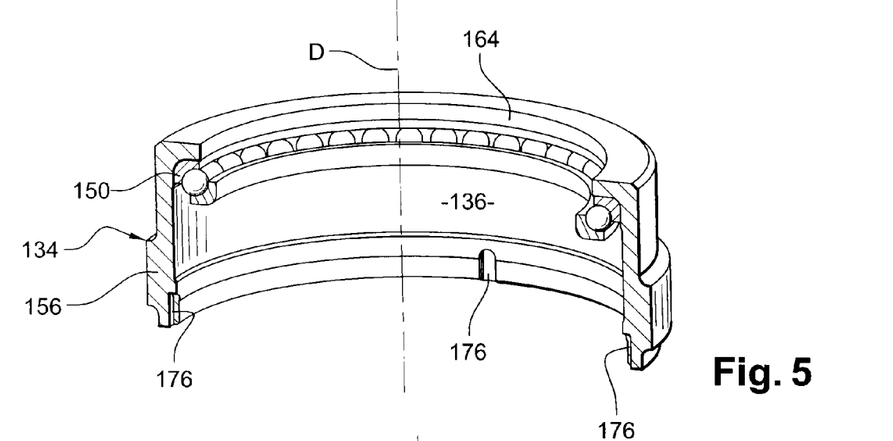
FIGS. 5 to 10 are schematic partial perspective views, with partial extraction, of the rotor member, plate and ring in FIG. 4, on a larger scale, and illustrate the steps for mounting said members.
Figure 6:
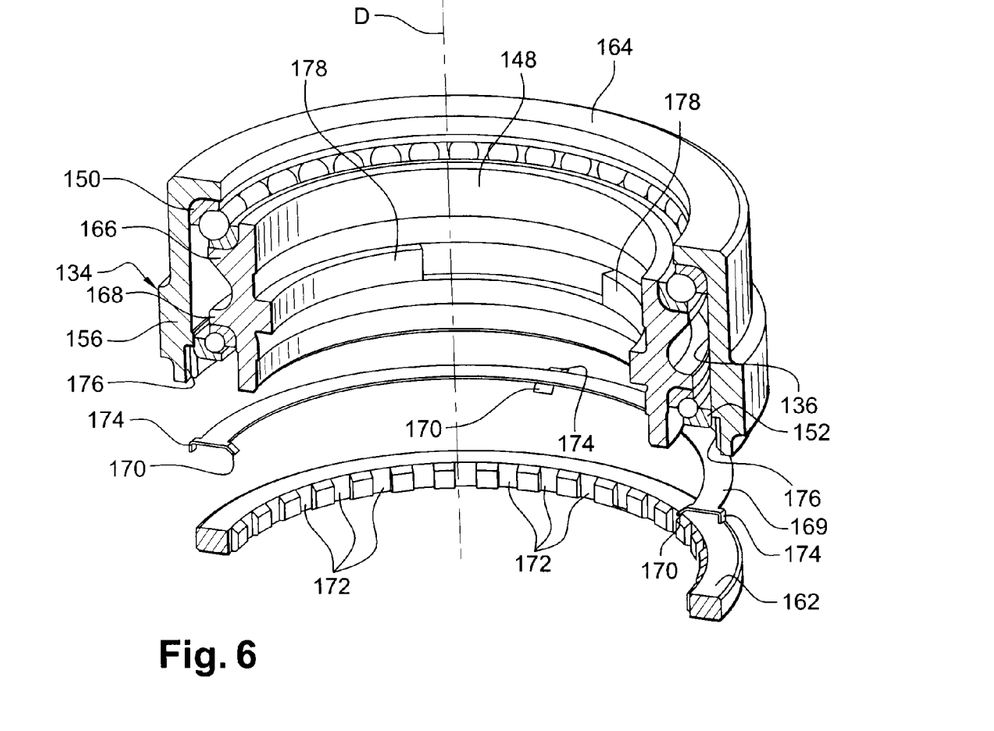

A first bearing 150 (ball bearing in the example shown) is mounted in the cylindrical housing 136 of the polygonal ring 134 (FIG. 5). It is centered on the axis D and is inserted in said housing by translation along said axis, from the inside. It rests at the radially external end thereof on an internal annular edge 164 of the housing 136. Said edge supports an external annular edge 166 of the ring 148 inserted in the housing 136 by translation along the axis D, from the inside (FIG. 6).

The ring 148 comprises a second external annular edge 168 situated radially inside said first external edge 166 and supporting the second bearing 152 (ball bearing in the example shown). This bearing 152 extends about the axis D and is inserted in the housing 136 by translation along said axis, from the inside.

A nut 162 is screwed into the radially internal end portion of the housing 136 and keeps the second bearing 152 pressing on the edge 168 of the ring. The ring 148 and the bearings 160, 162 are thus clamped between the edge 164 of the housing 136 and the nut 162 and are locked in a direction parallel with the axis D.

An annular locking washer 169 extending about the axis D is inserted between the bearing 152 and the nut 162 to lock said nut in rotation in the housing 136 of the polygonal ring. This washer 169 comprises at the internal periphery thereof first tabs 170 to be folded back inward and inserted in notches 172 having a complementary shape of the internal periphery of the nut 162 to lock the washer in rotation on the nut.

The washer 169 further comprises at the external periphery thereof second tabs 174 to be inserted in notches 176 having a complementary shape of the radially internal end of the cylindrical wall 156 of the housing 136, to lock the washer in rotation in the housing 136 (FIGS. 5 and 6).

The washer 169 is inserted in the housing 136 by translation along the axis D, from the inside, and the nut 162 is screwed into the housing 136 from the inside.

An annular member such as a "Ringspann" spring washer may be mounted about the axis D, between the washer 169 and the bearing 152, so as to prestress the two bearings 150, 152 along the axis D.

Figure 7:
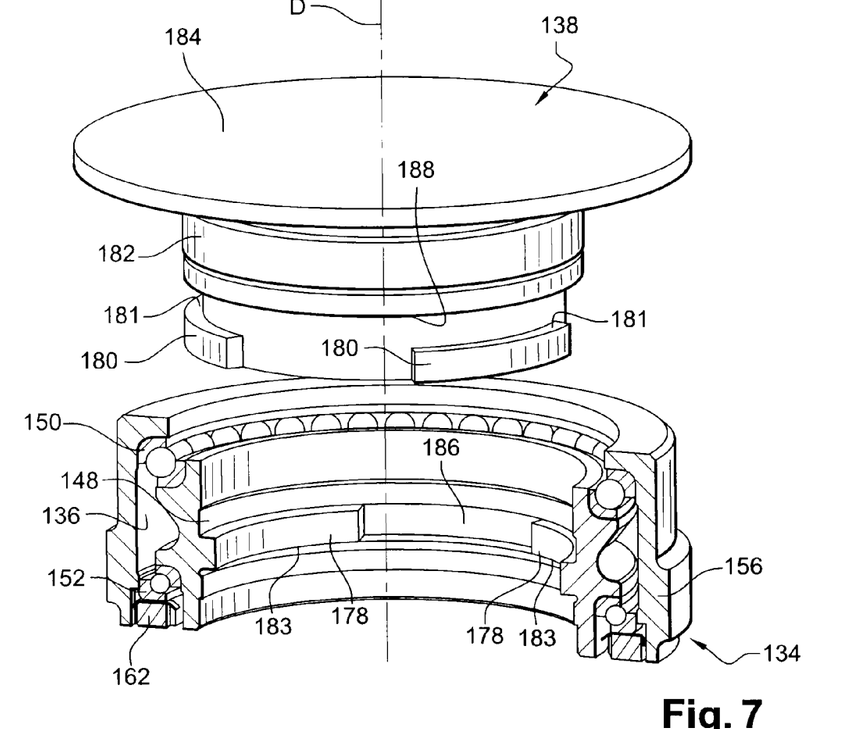
Figure 8:
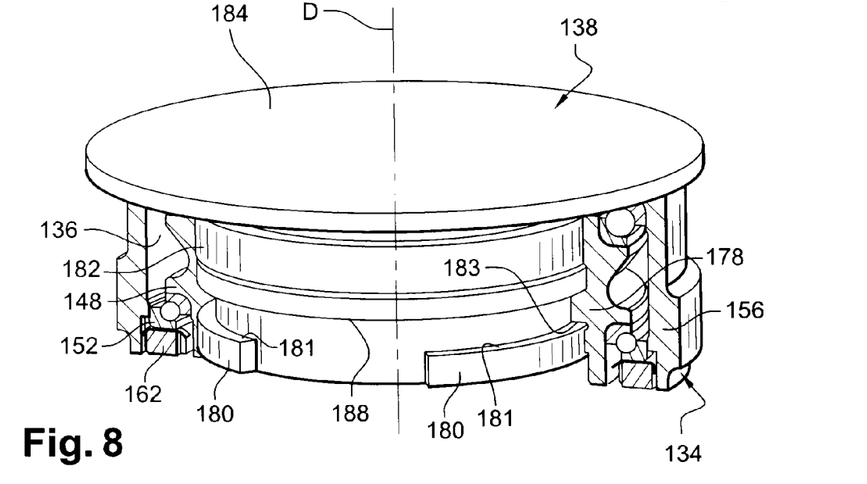

The ring 148 comprises teeth 178 protruding radially inward (in relation to the axis D) on the internal cylindrical surface thereof. These teeth 178 are three in number in the example shown and each have an angular span about the axis D of approximately 60°. They are distributed regularly about the axis D and are to be inserted between teeth 180 having a complementary shape of the plate 138 (FIG. 7).

In the example shown, the plate 138 comprises a substantially cylindrical body 182 whereon the abovementioned teeth 180 are formed by protrusion, extending radially outward (in relation to the axis D). This cylindrical body 182 is connected at the radially external end thereof to means 184 for attaching a blade.

The teeth 180 of the plate are formed by sectors of a first annular edge 181 extending about the axis D. Similarly, the teeth 178 of the ring are formed by sectors of an annular edge 183 extending about the axis D, to press against the first edge of the plate, to hold the plate in the outward radial direction and ensure the transmission of said loads between the plate and the ring.

The plate 138 is mounted by translation and rotation in the ring 148 as follows.

The plate 138 is presented radially outside the housing 136 of the polygonal ring 134 so that it is aligned on the axis D and the cylindrical body 182 thereof is situated next to the housing. The plate 138 is moved in rotation about the axis D to a first position represented in FIG. 7 wherein the teeth 180 thereof are aligned in a direction parallel with the axis D, with circumferential gaps 186 situated between the teeth 178 of the ring 148.

The plate 138 is then moved in translation along the axis D from the first position mentioned above to a second position shown in FIG. 8 where the teeth 180 of the plate are moved radially inside the teeth 178 of the ring, in relation to the axis C of the ring 134. Each tooth 180 of the plate is moved from the first to the second position by translation between two consecutive teeth 178 of the ring 148.

Figure 9:
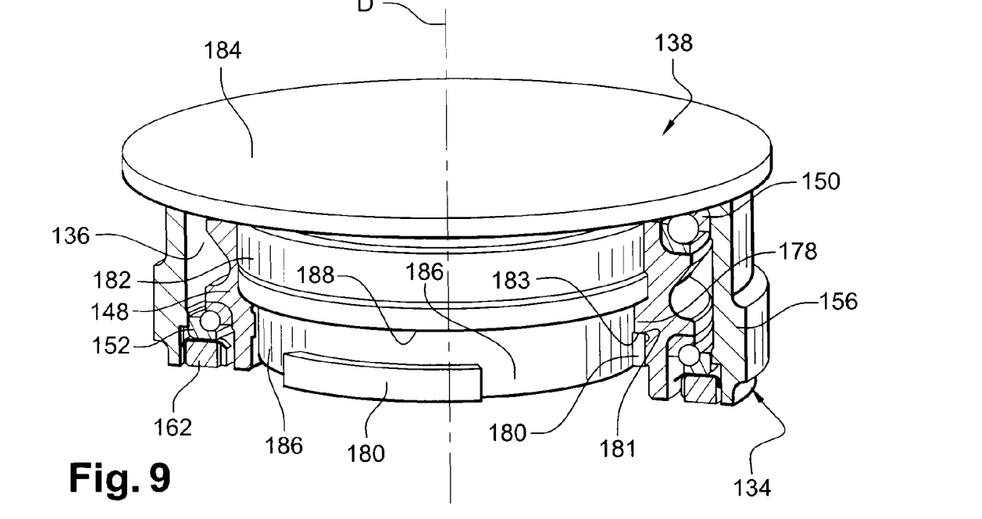

The plate 138 is then moved in rotation about the axis D to a third position wherein the teeth 180 thereof are aligned in a direction parallel with the axis D, with the teeth 178 of the ring 148 (FIG. 9).

In the example shown, the plate is to be rotated by approximately 60° (i.e. one sixth of a turn) about the axis D, in either direction, to move from the second to the third position.

To facilitate this step, the ring 148 may comprise at the radially internal end thereof one or a plurality of notches (not shown) for mounting a tool for locking the ring 148 in rotation in relation to the plate 138, until the claw teeth of the plate 138 are radially aligned with the claw teeth of the ring 148.

When the plate is in this third position, it is held in the outward radial direction (in relation to said axis C) by the teeth 180 pressing against the teeth 178 of the ring. Furthermore, the teeth 178 of the ring 148 press against a further external annular edge 188 of the plate to hold the plate radially inward. The edge 188 and the teeth 180 of the plate 138 define an annular groove extending about the axis D and wherein the teeth 178 of the ring 148 may slide in the circumferential direction (about the axis D).

Wedges 158 are provided to lock the ring 148 and the plate 138 in rotation in relation to each other. These wedges are three cylinder sectors in the example shown (FIG. 10) and are regularly distributed about the axis D. These sectors each have an angular span about said axis of approximately 60°, which is substantially equal to that of the circumferential gaps 186 situated between the teeth 178, 180 of the plate and the ring, for inserting the wedges in said gaps.

Figure 10:
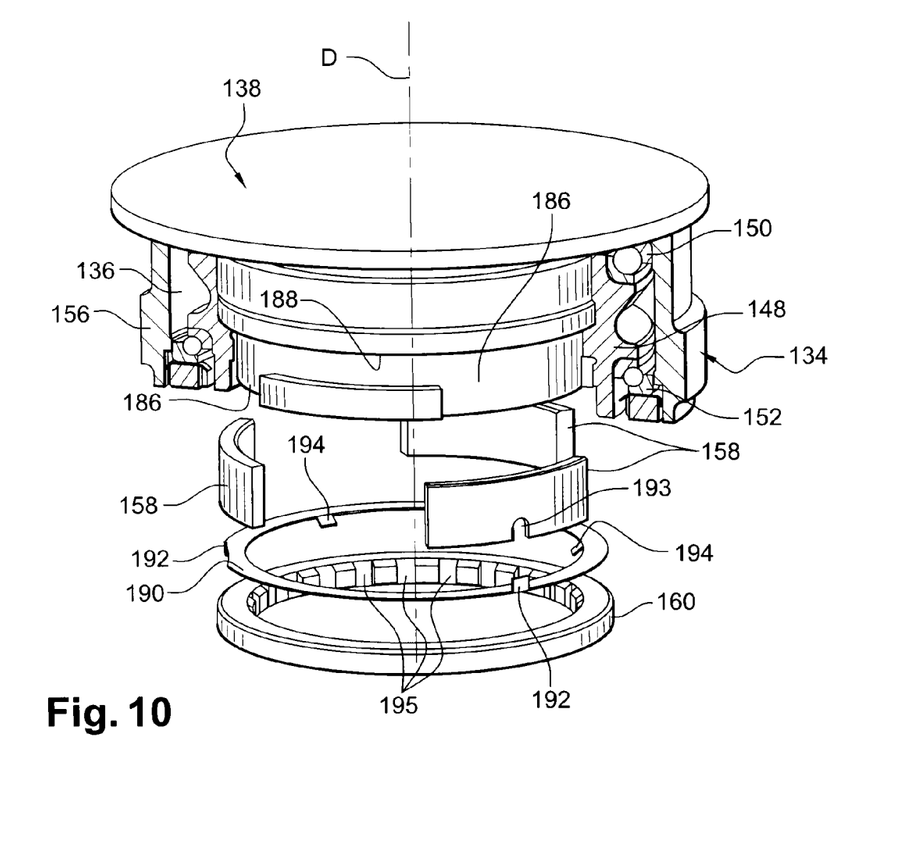

Each wedge 158 is inserted in one of these gaps 186 by translation along the axis D, from the inside, until it presses against the radially external end thereof (in relation to the axis C) on the edge 188 of the plate (FIG. 4). In this position, the wedges 158 press in the circumferential direction (in relation to the axis D) on the circumferential ends of the teeth 178, 180 of the plate and the ring to lock same in rotation in relation to each other.

The nut 160 is screwed in the radially internal end of the ring 148 and presses against the wedges 158. These wedges 158 are thus clamped in a direction parallel with the axis D between the edge 188 of the plate and the nut 160, and are locked along said axis on the ring.

A second annular locking washer 190 is inserted between the radially internal ends of the wedges 158 and the nut 160, to lock said nut in rotation on the ring.

Said washer 190 comprises at the internal periphery thereof first tabs 194 to be folded back inward and inserted in notches 195 having a complementary shape of the internal periphery of the nut 160 to lock the washer in rotation on the nut.

The washer 190 further comprises at the external periphery thereof second tabs 192 to be inserted in notches 193 having a complementary shape of the radially internal end of the wedges 158, to lock the washer in rotation on the ring.

The washer 190 is inserted in the housing 148 by translation along the axis D, from the inside, and the nut 160 is screwed into the ring from the inside (in relation to the axis C).

To facilitate the mounting of the wedges 158 in the gaps 186 situated between the teeth 178, 180, said wedges may be rigidly connected to the locking washer 190. For this purpose, the radially internal ends of the wedges 158 may be applied and attached (for example by bonding) on the radially external face of the washer 190.

In operation, the centrifugal forces to which the propeller blades are subjected are transmitted to the polygonal ring 134 via the plates 138, rings 148 and bearings 150.

The transmission of the loads between the plates and the rings is performed by the teeth 178, 180 pressing against each other (in a direction parallel with the axis D) and which are designed to withstand the abovementioned loads. In one particular example of an embodiment of the invention, each tooth 180 of the plate (and the ring) may have a thickness or dimension in the radial direction (in relation to the axis D) of approximately 5 mm and an axial height or dimension (along the axis D) of 12.5 mm.

Figure 11:
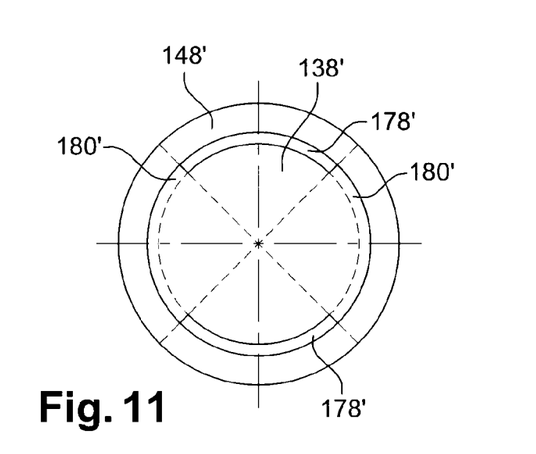
FIG. 11 is a schematic partial top view of a plate and a ring of an alternative embodiment of the propeller according to the invention.

In the alternative embodiment shown in FIG. 11, the teeth 180' of the plate 138' are two in number in the example shown and each have an angular span about the axis of revolution of the plate of approximately 90°. These teeth 180' are diametrically opposed in relation to the axis of revolution of the plate and are intended to engage with two teeth 178' having a complementary shape of the ring 148'.

In a further alternative embodiment not shown, the number of the teeth of the plate (and the ring) may be greater than or equal to 3, the number and arrangement of said teeth being for example dependent on the distribution and application requirements of the loads transmitted by the blade in operation.

FIGS. 12 to 16 represent a further embodiment of the means for supporting and guiding a blade in rotation, which are mounted in each housing 236 of a polygonal ring 234.

Figure 12:
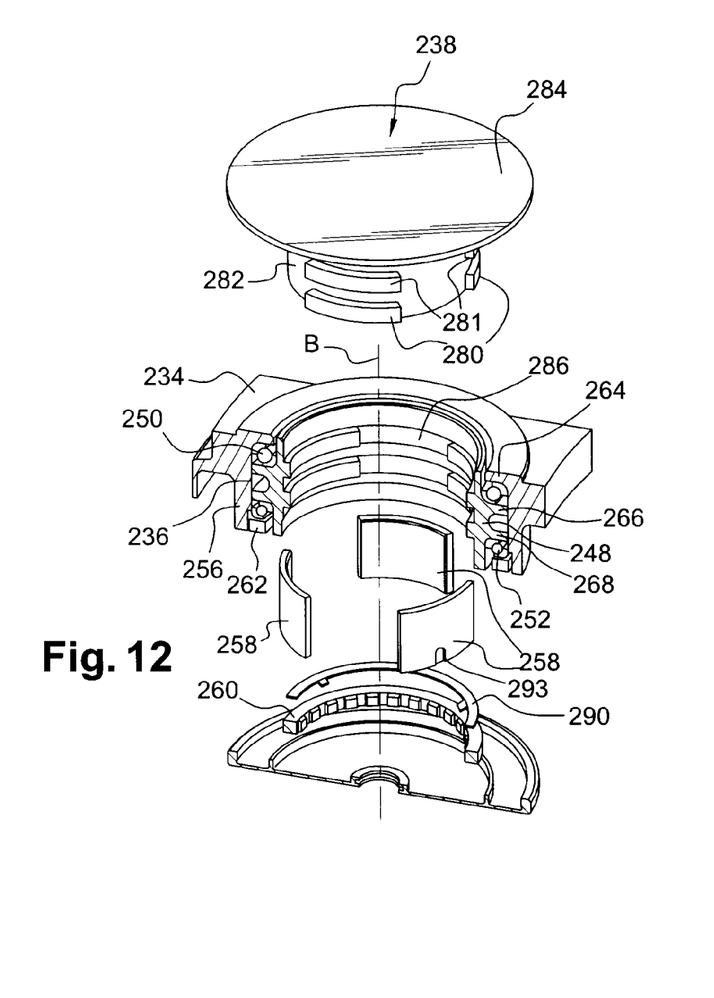
FIG. 12 is an exploded partial schematic perspective view, with partial extraction, of a rotor member such as that in FIG. 3, on a larger scale and in a housing wherein a blade support plate and a ring according to an alternative embodiment of the invention are mounted.

These means comprise a blade support plate 238 mounting by means of claw coupling inside a ring 248 centered and guided in rotation in the housing 236 of the polygonal ring 234 by means of two coaxial ball bearings 250, 252. The plate 238 and the ring 248 are locked in rotation in relation to each other by wedges 258. The plate 238 and the ring 248 are rigidly connected in rotation with each other and are centered and guided in rotation about a radial axis B which is the axis of the housing 236 of the ring. Nuts 260, 262 are screwed onto the ring 248 and on the cylindrical wall 256 of the ring 234, respectively, to lock the abovementioned members together.

The various steps for mounting said members will now be described with reference to FIGS. 12 to 14.

Figure 13:
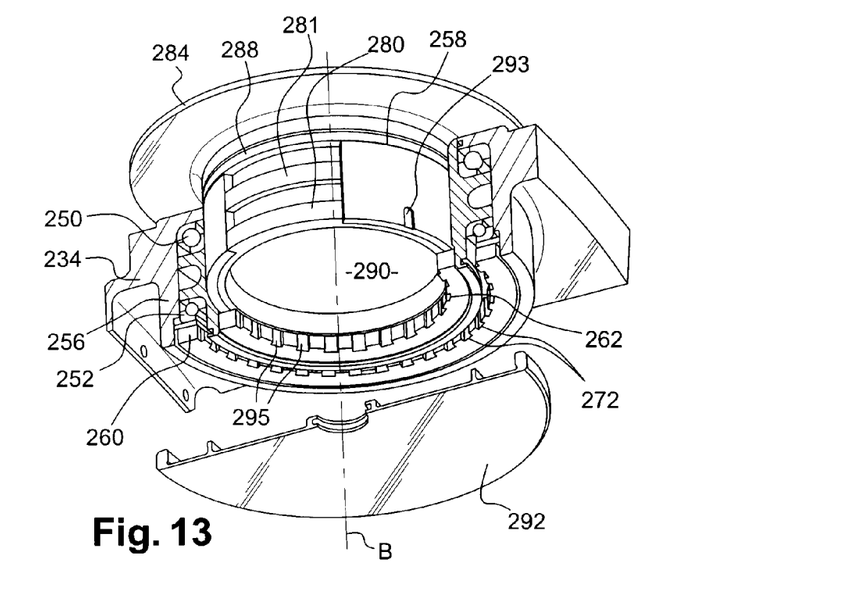
FIGS. 13 to 15 are schematic partial perspective views, with partial extraction, of the rotor member, plate and ring in FIG. 12, on a larger scale.

A first bearing 250 (ball bearing in the example shown) is mounted in the cylindrical housing 236 of the polygonal ring 234 (FIG. 13). It is centered on the axis B and is inserted in said housing by translation along said axis, from the inside. It rests at the radially external end thereof on an internal annular edge 264 of the housing 236. Said edge supports an external annular edge 266 of the ring 248 inserted in the housing 236 by translation along the axis B, from the inside (FIG. 14).

The ring 248 comprises a second external annular edge 268 situated radially inside said first external edge 266 and supporting the second bearing 252 (ball bearing in the example shown). This bearing 252 extends about the axis B and is inserted in the housing 236 by translation along said axis, from the inside.

A nut 262 is screwed into the radially internal end portion of the housing 236 and holds the second bearing 252 pressing on the edge 268 of the ring. The ring 248 and the bearings 260, 262 are thus clamped between the edge 264 of the housing 136 and the nut 162 and are locked in a direction parallel with the axis B.

An annular locking washer 269 (FIGS. 14 and 15) extending about the axis B is inserted between the bearing 252 and the nut 262 to lock said nut in rotation in the housing 236 of the polygonal ring.

This washer 269 comprises at the internal periphery thereof first tabs 270 (FIG. 14) to be folded back inward and inserted in notches 272 (FIG. 13) having a complementary shape of the internal periphery of the nut 262 to lock the washer in rotation on the nut.

The washer 269 further comprises at the external periphery thereof second tabs 274 (FIG. 14) to be inserted in notches 276 having a complementary shape of the radially internal end of the cylindrical wall 256 of the housing 236, to lock the washer in rotation in the housing 236.

The washer 269 is inserted in the housing 236 by translation along the axis B, from the inside, and the nut 262 is screwed into the housing 236 from the inside.

An annular member 277 such as a "Ringspann" spring washer may be mounted about the axis B, between the washer 269 and the bearing 252, so as to prestress the two bearings 250, 252 along the axis B.

The ring 248 comprises two rows of coaxial annular teeth 278, 279 protruding radially inward (in relation to the axis B) on the internal cylindrical surface thereof, a first row of teeth 278 and a second row of teeth 279 situated radially outside the first row of teeth.

The teeth 278, 279 of each row are three in number in the example shown and each have an angular span about the axis B of approximately 60°. The teeth 278, 279 of each row are distributed regularly about the axis B and are each aligned in a direction parallel with the axis B with a tooth of the other row.

In the example shown, the first row of teeth 279 and the external annular edge 268 of the ring are situated substantially in the same plane transverse to the axis B, and the second row of teeth 280 thereof and the external annular edge 266 are situated substantially in a further plane transverse to the axis B.

Figure 15:
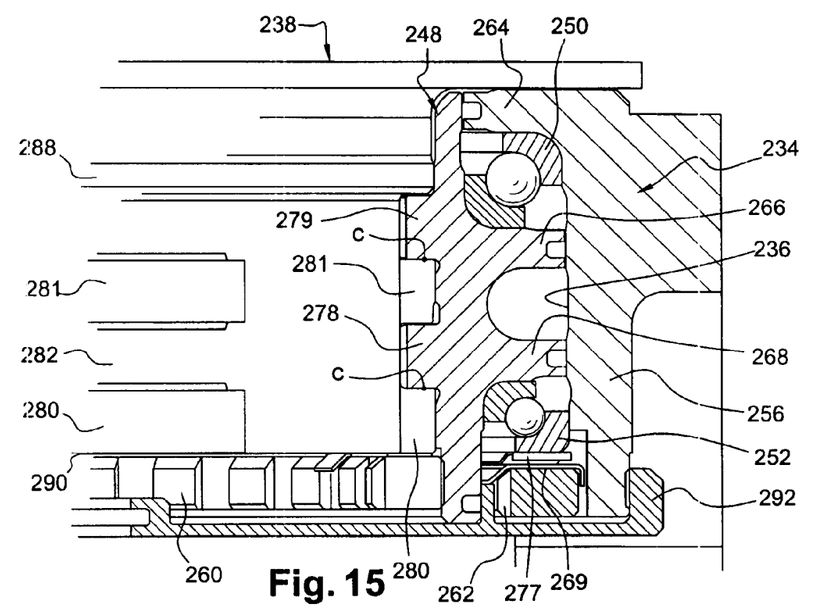

The teeth 278, 279 of the ring are to be inserted between teeth 280, 281 having a complementary shape of the plate 238 (FIG. 15).

The plate 238 comprises a substantially cylindrical body 282 connected to the radially external end thereof to means 284 for attaching a blade and whereon two coaxial annular rows of teeth 280, 281 protrude, extending radially outward (in relation to the axis B), a first row of teeth 280 and a second row of teeth 281 situated radially outside the first row.

The teeth 280, 281 of each row of the plate are regularly distributed about the axis B and are each aligned in a direction parallel with the axis B with one tooth of the other row.

The teeth 280, 281 of the plate are formed by sectors of an annular edge extending about the axis B. Similarly, the teeth 278, 279 of the ring are formed by sectors of an annular edge extending about the axis B, to press against one of said edges of the plate, to hold the plate in the outward radial direction and ensure the transmission of said loads between the plate and the ring.

The plate 238 is mounted by translation and rotation in the ring 248 as follows.

The plate 238 is presented radially outside the housing 236 of the polygonal ring 234 so that it is aligned on the axis B and the cylindrical body 282 thereof is situated next to the housing. The plate 238 is moved in rotation about the axis B to a first position represented in FIG. 12 wherein the teeth 280, 281 thereof are aligned in a direction parallel with the axis B, with circumferential gaps 286 situated between the teeth 278, 279 of the ring 248.

The plate 238 is then moved in translation along the axis B from the first position mentioned above to a second position where the teeth 280 of the plate are moved radially inside the teeth 278 of the ring of the ring and the teeth 281 of the plate are moved radially inside the teeth 279 of the ring, in relation to the axis A of the ring 234. Each tooth 280, 281 of the plate is moved from the first to the second position by translation between two consecutive teeth 278, 279 of the ring 248.

Figure 14:
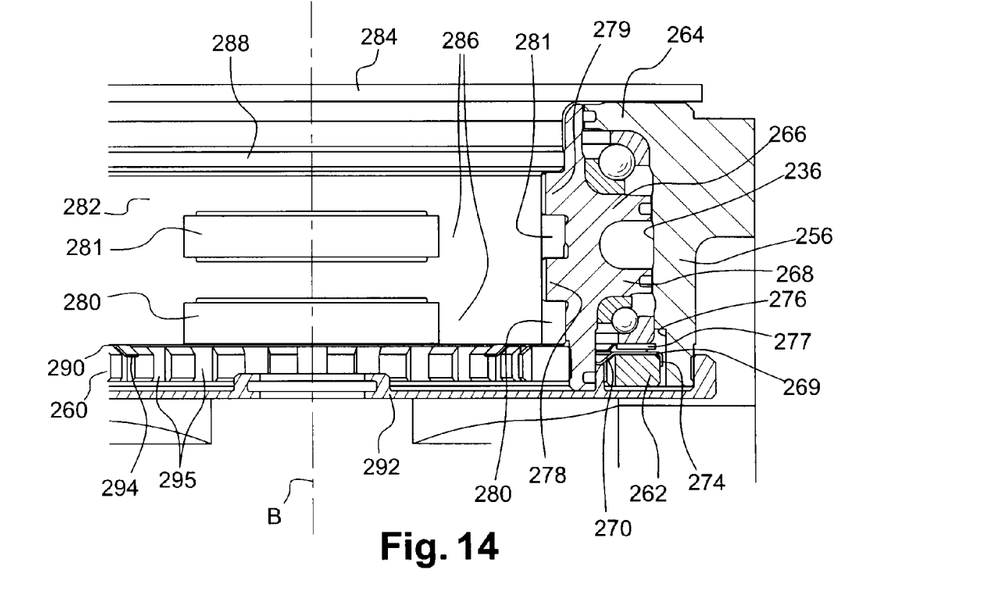

The plate 238 is then moved in rotation about the axis B to a third position wherein the teeth 280, 281 thereof are aligned in a direction parallel with the axis B, with the teeth 278, 279 of the ring 248 (FIG. 14).

In the example shown, the plate 238 is to be rotated by approximately 60° (i.e. one sixth of a turn) about the axis B, in either direction, to move from the second to the third position.

When the plate is in this third position, it is held in the outward radial direction (in relation to said axis A) by the teeth 280, 281 pressing against the teeth 278, 279 of the ring (pressing along c shown in FIG. 15). Furthermore, the teeth 279 of the second row of the ring 248 press via the radially external ends thereof against a further external annular edge 288 of the plate (FIG. 14) to hold the plate radially inward.

The edge 288 and the second row of teeth 281 of the plate 238 define an annular groove extending about the axis B and wherein the teeth 279 of the second row of the ring 248 may slide in the circumferential direction (about the axis B). Similarly, the two rows of teeth 280, 281 of the plate mutually define an annular groove extending about the axis B and wherein the teeth 278 of the first row of the ring 248 may slide in the circumferential direction (about the axis B).

Wedges 258 are provided to lock the ring 248 and the plate 238 in rotation in relation to each other. These wedges 258 are three cylinder sectors in the example shown (FIG. 12) and are regularly distributed about the axis B. These sectors each have an angular span about said axis of approximately 60°, which is substantially equal to that of the circumferential gaps 286 situated between the teeth 278, 279, 280, 281 of the plate and the ring, for inserting the wedges in said gaps.

Each wedge 258 is inserted in one of these gaps 286 by translation along the axis B, from the inside, until it presses against the radially external end thereof (in relation to the axis A) on the edge 288 of the plate (FIG. 13). In this position, the wedges 258 press in the circumferential direction (in relation to the axis B) on the circumferential ends of the teeth 278, 279, 280, 281 of the plate and the ring, to lock same in rotation in relation to each other.

The nut 260 is screwed in the radially internal end of the ring 248 and presses against the wedges 258. These wedges 258 are thus clamped in a direction parallel with the axis B between the edge 288 of the plate and the nut 260, and are locked along said axis on the ring.

A second annular locking washer 290 is inserted between the radially internal ends of the wedges 258 and the nut 260, to lock said nut in rotation on the ring.

Said washer 290 comprises at the internal periphery thereof first tabs 294 (FIG. 14) to be folded back inward and inserted in notches 295 having a complementary shape of the internal periphery of the nut 260 to lock the washer in rotation on the nut.

The washer 290 further comprises at the external periphery thereof second tabs (not shown) to be inserted in notches 293 having a complementary shape of the radially internal end of the wedges 258, to lock the washer in rotation on the ring.

The washer 290 is inserted in the housing 248 by translation along the axis B, from the inside, and the nut 260 is screwed into the ring from the inside (in relation to the axis A).

In operation, the centrifugal forces to which the propeller blades are subjected are transmitted to the polygonal ring 234 via the plates 238, rings 248 and bearings 250.

The transmission of the loads between the plates and the rings is performed by the teeth 278, 279, 280, 281 pressing against each other (in a direction parallel with the axis B) and which are designed to withstand the abovementioned loads.

In one particular example of an embodiment of the invention, each tooth 278, 279, 280, 281 of the body of the plate and the ring defines a cylindrical tooth bearing having a thickness or dimension in the radial direction (in relation to the axis B) greater than or equal to 1.5 mm.

The internal cylindrical surface of the body 282 of the plate defines a chamber 290 for housing means (not shown) for connecting the plate and the ring to means for rotating the blade. These connection means comprise a planet pinion or gear, for example.

The chamber 290 is closed at the radially external end thereof by means 284 for attaching the blade at the radially internal end therefore by an annular cover 292 mounted and screwed onto the radially internal end of the cylindrical wall 256 of the housing.

Figure 16:
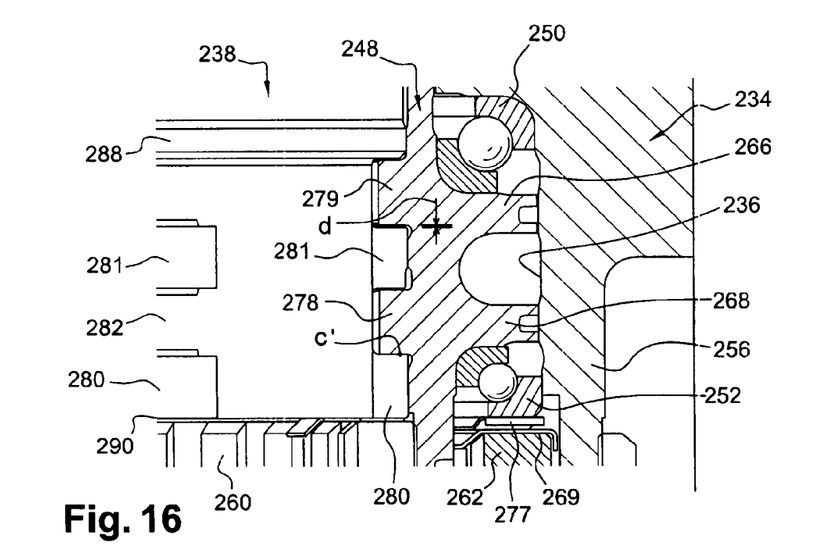
FIG. 16 is a view corresponding to FIG. 15 and representing an alternative embodiment of the invention.

In the alternative embodiment shown in FIG. 16, when the first row of teeth 280 of the body of the plate 238 is pressing radially along c on the first row of teeth 278 of the ring 248, in the normal position for use, the second row of teeth 281 of the body of the plate is separated by a small clearance d (measured in a direction parallel with said axis B) of the second row of teeth 279 of the ring.

The first rows of teeth 280, 278 of the plate and the ring are thus the only ones to transmit the loads to which the blades are subjected in operation, in the normal position for use. However, in the event of deformation or rupture of said teeth 280, 278, the plate 238 is moved radially outward under the effect of the centrifugal forces, until the second row of teeth 281 presses against the second row of teeth 279 of the ring. The second rows of teeth 279, 281 of the ring and of the plate then ensure the transmission of the loads to which the blades are subjected.

These second rows of teeth 279, 281 thus form a safety device in the event of deformation or rupture of the first rows of teeth 278, 280, for the radial retention of the blades on the rotor member.

The clearance d is not more than a few tenths of a millimeter and is for example between 0.1 and 0.2 mm. It is 0.0175 mm in on particular embodiment of the invention.

The invention claimed is:

1. Controllable pitch blade non-ducted propeller for a jet engine, the propeller blades being rotatably mounted about the axes thereof in radial housings of an annular rotor member and each blade being supported by a cylindrical body plate whereon a cylindrical ring is attached, centered and guided in rotation by bearings in a radial housing of the rotor member, wherein, the ring being engaged in the housing by radial translation from the inside and the plate being engaged in said housing by radial translation from the outside, the internal surface of the ring and the external surface of the cylindrical body of the plate comprise complementary protruding teeth enabling radial translation of the teeth of the body of the plate between the teeth of the ring and the radial retention of the teeth of the body of the plate by the teeth of the ring, after rotating the plate in relation to the ring by a predetermined angle.

2. Propeller according to claim 1, wherein the cylindrical body of the plate comprises three teeth each having an angular span of approximately 60°, which are regularly distributed about the axis of the cylindrical body.

3. Propeller according to claim 1, wherein the cylindrical body of the plate comprises two teeth each having an angular span of approximately 90° and which are diametrically opposed in relation to the axis of the cylindrical body.

4. Propeller according to claim 1, wherein the internal surface of the ring and the external surface of the body of the plate may each comprise at least two annular rows of teeth, the first and second row of teeth of the ring being, in a normal position for mounting and use, situated respectively radially outside the first and the second row of teeth of the body of the plate.

5. Propeller according to claim 4, wherein the teeth of the first row of the body of the plate press radially outward on the teeth of the first row of the ring, in the normal position for mounting and use.

6. Propeller according to claim 5, wherein the teeth of the second row of the body of the plate are separated, in said normal position, from the teeth of the second row of the ring by a radial distance of not more than a few tenths of a millimeter.

7. Propeller according to claim 5, wherein the first row of teeth of the body of the plate is situated radially inside the second row of teeth of said body.

8. Propeller according to claim 4, wherein the teeth of the first and second row of the body of the plate press radially outward on the teeth of the first and second rows of the ring, respectively, in said normal position for mounting and use.

9. Propeller according to claim 5, wherein the teeth of the or each row of the body of the plate press against the corresponding teeth of the ring by a cylindrical tooth bearing having a dimension in the radial direction, in relation to the axis of the body of the plate, greater than or equal to 1.5 mm.

10. Propeller according to claim 4, wherein the teeth of each row of the ring are regularly distributed about the axis of the ring and are each aligned in the radial direction with a tooth of the other row of the ring, and the teeth of each row of the body of the plate are regularly distributed about the axis of said body and are each aligned in the radial direction with a tooth of the other row of the body of the plate.

11. Propeller according to claim 1, wherein it comprises means for locking the body of the plate in rotation in the ring.

12. Propeller according to claim 11, wherein the locking means comprise wedges in the form of cylinder sectors inserted circumferentially between the teeth of the cylindrical body of the plate and the ring.

13. Propeller according to claim 12, wherein the wedges are engaged between said teeth by radial translation and are held in place by a nut screwed onto the ring.

14. Propeller according to claim 13, wherein an annular washer is inserted between the wedges and the nut screwed onto the ring, said washer comprising first means engaging via shape connections with complementary means of at least one of the wedges, and second means engaging via shape connections with complementary means of the nut, to lock the nut in rotation with respect to the ring.

15. Propeller according to claim 12, wherein the wedges and the ring press in the axis of the housing on an external annular edge of the body of the plate.

16. Propeller according to claim 1, wherein the ring is centered and guided in rotation in the housing of the polygonal ring by two coaxial bearings, one of which is mounted between an annular internal edge of the rotor housing and an annular external edge of the ring, at the radially external edge thereof, the other being mounted between an annular external edge of the ring, at the radially internal edge thereof, and a nut screwed into the rotor housing from the radially internal end of said housing.

17. Propeller according to claim 16, wherein the internal surface of the ring comprises two coaxial annular rows of teeth, which are substantially aligned in the transverse direction, in relation to the axis of the ring, with the external annular edges thereof, respectively.

18. Propeller according to claim 16, wherein an annular washer is inserted between the other bearing and the nut screwed into the housing, said washer comprising first means engaging via shape connections with complementary means of the housing, and second means engaging via shape connections with complementary means of the nut, to lock the nut in rotation in the rotor housing.

19. Propeller according to claim 1, wherein the plate and the ring are connected to rotation drive means by connection means housed inside the body of the plate, comprising a planet pinion or gear.

20. Propeller according to claim 1, wherein each housing of the rotor member is closed at the radially internal end thereof using an annular cover screwed onto the rotor member and pressing against the radially internal end of the ring housed in said housing.

21. Jet engine, wherein it comprises at least one propeller according to any of the above claims.

* * * * *